(12) United States Patent
Katayama et al.

(10) Patent No.: US 7,133,730 B1
(45) Date of Patent: Nov. 7, 2006

(54) AUDIO APPARATUS, CONTROLLER, AUDIO SYSTEM, AND METHOD OF CONTROLLING AUDIO APPARATUS

(75) Inventors: Masaki Katayama, Hamamatsu (JP); Yasuhiro Fujimura, Hamamatsu (JP)

(73) Assignee: Yamaha Corporation, Shizuoka (JP)

( * ) Notice: Subject to any disclaimer, the term of this patent is extended or adjusted under 35 U.S.C. 154(b) by 850 days.

(21) Appl. No.: 09/594,995

(22) Filed: Jun. 14, 2000

(30) Foreign Application Priority Data

Jun. 15, 1999 (JP) .................................. 11-169023

(51) Int. Cl.
G06F 17/00 (2006.01)
H04R 5/02 (2006.01)
G05B 19/02 (2006.01)
H04B 1/20 (2006.01)

(52) U.S. Cl. .................... 700/94; 381/309; 381/310; 381/311; 340/825.24; 340/825.25

(58) Field of Classification Search .................. 700/94; 340/825.24, 825.25, 825.22; 345/700; 381/310, 381/309, 311, 1, 17, 18, 61, 63
See application file for complete search history.

(56) References Cited

U.S. PATENT DOCUMENTS

| | | | | |
|---|---|---|---|---|
| 5,272,757 A | * | 12/1993 | Scofield et al. | ............. 381/381 |
| 5,459,790 A | * | 10/1995 | Scofield et al. | ............. 381/310 |
| 5,598,478 A | | 1/1997 | Tanaka et al. | |
| 6,219,736 B1 | * | 4/2001 | Klingman | ................... 710/315 |
| 6,496,122 B1 | * | 12/2002 | Sampsell | ............... 340/825.69 |

FOREIGN PATENT DOCUMENTS

| | | |
|---|---|---|
| EP | 563929 A2 * | 10/1993 |
| EP | 0 571 638 A1 | 12/1993 |
| EP | 571638 A1 * | 12/1993 |
| JP | 63-171013 | 7/1988 |
| JP | 63-158028 | 10/1988 |
| JP | 2-37425 | 2/1990 |
| JP | 2-117202 | 5/1990 |
| JP | 4-15693 | 1/1992 |
| JP | 6-119167 | 4/1994 |
| JP | 6-149760 | 5/1994 |
| JP | 06-245300 | 9/1994 |
| JP | 6-348466 | 12/1994 |

(Continued)

OTHER PUBLICATIONS

Applicant's admitted prior art (Figures 11 and 12), p. 1, line 15-p. 4, line 3.*

(Continued)

*Primary Examiner*—Vivian Chin
*Assistant Examiner*—Devona E. Faulk
(74) *Attorney, Agent, or Firm*—Dickstein, Shapiro, LLP.

(57) ABSTRACT

Control data is stored in a first memory. Control data inputted from an external device is stored a second rewritable memory. A control section selects either one of the first and second memories and controls operation according to a control program using the control data stored in the memory selected. An image corresponding to control data is displayed on a display screen. Through the image, it is possible to select particular control data from a plurality of control data. The control data selected via the screen is sent to the second memory. Processing can be therefore executed to appropriately cope with requirements of the user.

6 Claims, 12 Drawing Sheets

| | FOREIGN PATENT DOCUMENTS | |
|---|---|---|
| JP | 07-015395 | 1/1995 |
| JP | 07015395 A * | 1/1995 |
| JP | 7-141191 | 6/1995 |
| JP | 8-126099 | 5/1996 |
| JP | 9-134283 | 5/1997 |
| JP | 09-266433 | 10/1997 |
| JP | 10-84240 | 3/1998 |
| JP | 10-145900 | 5/1998 |

OTHER PUBLICATIONS

Japanese Office Action issued Oct. 7, 2003 (w/ English translation of relevant portion).

John W. Norris, The Jounal of the Acoustical Society of America, vol. 105, Issue 2, p. 933 (1999).

* cited by examiner

AUDIO APPARATUS, CONTROLLER, AUDIO SYSTEM, AND METHOD OF CONTROLLING AUDIO APPARATUS

This application is based on Japanese patent application Hei-11-169023 filed on Jun. 15, 1999, the entire contents of which are incorporated herein by reference.

BACKGROUND OF THE INVENTION

1. Field of the Invention

The present invention relates to an audio apparatus, a controller, an audio system, and a method of controlling an audio apparatus, and in particular, to a technique to expand functions of the audio apparatus.

2. Description of the Related Art

FIG. 11 shows a block diagram of an outline of an amplifier system as an example of a stand-alone audio system of the prior art.

An external compact disk (CD) player supplies a digital audio signal or an analog audio signal to a CD player terminal T1. An external tuner inputs an analog audio signal to a tuner terminal T2. Other audio signals are fed to a first auxiliary terminal T3 and a second auxiliary terminal T4. An input selector SL is connected to the terminals T1 to T4. The selector SL includes a digital-to-analog (D/A) converter and an analog-to-digital (A/D) converter, which are not shown. An analog audio signal is delivered via the selector SL to an audio amplifier section AM. The amplifier section AM includes a digital signal processor (DSP) to execute sound field processing through digital signal processing and amplifies the audio signal, and then outputs the amplified signal to a speaker terminal Ts. The terminal Ts is connected to a loudspeaker, not shown. A central processing unit (CPU) 150 controls the overall operation of the amplifier system AS. A read-only memory (ROM) 151 stores various programs for DSP, data for DSP which are used for executing sound field processing, various control programs, and control data which are used by CPU 150. A random access memory (RAM) 152 serves as a work area to temporarily store various data items. A display section 153 displays various information items such as a sound source being selected and a DSP mode. An operator panel 154 includes various types of operation keys.

A bus 155 connects the input selector SL, the CPU 150, the ROM 151, the RAM 152, the display 153, and the operator panel 154 to each other.

Operation of the amplifier system will be briefly described.

First, description will be given of a situation in which DSP is not conducted. When a user activates a selection switch, not shown, of the operator panel 154, an operation state of the panel 154 is notified via the bus 155 to the CPU 150. The input selector SL connects under control of the CPU 150 one of the terminals T1 to T4 to the audio amplifier section AM.

An external equipment inputs an analog audio signal via the selector SL to the amplifier section AM. The amplifier section AM amplifies the input signal and then outputs the amplified signal to the speaker terminal Ts. The speaker connected to the terminal Ts sounds.

Concurrently, the display section 153 displays information of the selected sound source (e.g., a CD player) or the like.

Next, description will be given of a situation to conduct DSP. When a user operates a selection switch and a DSP mode selection switch, not shown, of the panel 154, an operation state of the panel 154 is notified via the bus 155 to the CPU 150. Under control of the CPU 150, the input selector SL sequentially stores a digital signal obtained by A/D converting an analog audio signal inputted from one of the terminals T1 to T4 in an RAM in the DSP in the amplifier section AM.

Under control of the CPU 150, the DSP reads from the ROM 151 a program corresponding to the selected DSP mode ("HALL", "JAZZ", "ROCK", or "DISCO" mode) and conducts DSP for the digital audio signal stored in the DSP RAM. The amplifier section AM amplifies the analog audio signal resultant from the DSP and then outputs the amplified signal to the speaker terminal Ts. The speaker connected to the terminal Ts produces sound.

The display section 153 displays information of the selected sound source (e.g., a CD player), the selected DSP mode (e.g., "JAZZ"), and the like.

Description will now be given of operation in which a 4-speaker playback is achieved by an audio amplifier connected to two speakers. A sound field processor SFP is used to produce playback sound of virtual rear speakers.

Assume that a front side of a listener has an azimuth of 0°. As shown in FIG. 12, the ROM 160 beforehand stores virtual three-dimensional DSP parameters for virtual speakers arranged with an azimuth of 120° in the rear side of the listener.

Data items of the DSP parameters are prepared to cope with respective sampling frequencies of a source signal, namely, 48 kHz, 44.1 kHz, and 32 kHz. In the processing of the DSP, the system uses DSP parameters corresponding to a sampling frequency of a sound source selected by the user.

In the amplifier of the prior art as above, the DSP parameter data (control data) is beforehand stored in the ROM. Therefore, the system cannot easily satisfy various requirements of the user, neither the user can simply modify the DSP parameter data.

The DSP control program is also stored in the ROM in advance. Even a function which can be added to the audio amplifier in consideration of the system configuration cannot be easily added thereto in the prior art.

This leads to a problem, namely, the user must buy another system to implement a new function.

SUMMARY OF THE INVENTION

It is therefore an object of the present invention to provide an audio apparatus, a controller, an audio system, and a method of controlling an audio apparatus which can appropriately execute processing in response to various requirements of the user and which can cope with expansion of functions in the future.

According to one aspect of the present invention, there is provided an audio apparatus, comprising: a first memory in which control data is stored; a second rewritable memory for storing control data inputted from an external device; and a control section for selecting either one of the first and second memories and for controlling operation according to a control program using the control data stored in the memory selected.

According to another aspect of the present invention, an audio apparatus, comprising: a first memory in which a control program is stored; a second rewritable memory in which a control program inputted from an external device is stored; and a control section for selecting either one of the first and second memories and for controlling operation according to the control program stored in the memory selected.

According to another aspect of the present invention, a controller, comprising: a display screen for displaying an image corresponding to control data, the image being used to select therethrough particular control data from a plurality of control data; and a processor for transmitting to an external device the control data selected via the display screen.

According to another aspect of the present invention, an audio system, comprising: an audio apparatus, including a first memory in which control data is stored, a second rewritable memory for storing control data inputted from an external device, and a control section for selecting either one of the first and second memories and for controlling operation according to a control program using the control data stored in the memory selected; and a controller, including an operation screen for displaying an image corresponding to control data, the image being used to select therethrough particular control data from a plurality of control data, and a processor for transmitting the control data selected via the operation screen to the audio apparatus.

According to another aspect of the present invention, a method of controlling an audio apparatus, comprising the steps of: storing in a rewritable memory second control data which can be used in place of first control data beforehand stored; selecting either one of the first control data beforehand stored and the second control data stored in the rewritable memory; and controlling operation using the control data selected.

According to another aspect of the present invention, a method of controlling an audio apparatus, comprising the steps of: storing in a rewritable memory a second control program which can be used in place of a first control program beforehand stored; selecting either one of the first control program beforehand stored and the second control program stored in the rewritable memory; and controlling operation according to the control program selected.

A basic control program and basic control data are provided. To control operation, the system uses, in place of the basic control program, a control program inputted from an external device; stores control data, in place of the basic control data, in a memory to be updated if necessary; uses a control program in place of the basic control program, or uses control data in place of the basic control data. Therefore, various requests from the user can be satisfied and the system can be functionally expanded in the future without difficulty.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
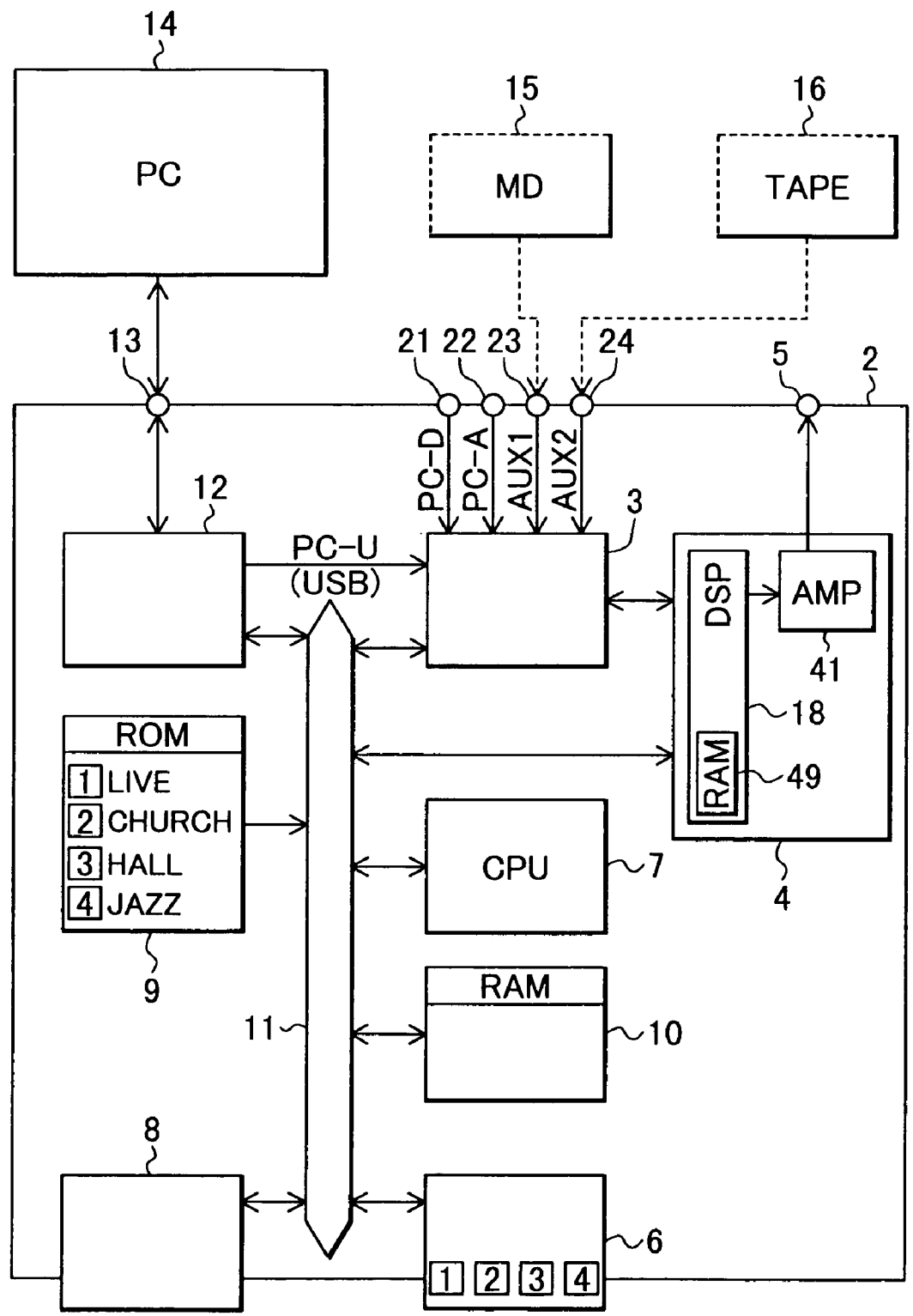
FIG. 1 is a block diagram showing a general configuration of an audio system.

FIG. 1 shows a general block diagram of an embodiment of an audio system according to the present invention.

The audio system 1 includes a receiver 2 and a personal computer 14. The receiver 2 includes a tuner section, not shown. The personal computer 14 is connected via a USB interface 12 to the receiver 2 to control the receiver 2. If desired, the user can expand the audio system 1 by connecting a mini-disk (MD) player 15 to a first auxiliary terminal 23, which will be described later, and/or a tape deck 16 to a second auxiliary terminal 24, which will be described later.

An outline of the construction of the receiver 2 will be described by referring to FIG. 1.

A digital audio signal from a sound card of the personal computer 14 is inputted to a digital audio signal terminal 21. An analog audio signal from a sound card of the computer 14 is fed to an analog audio signal terminal 22. A digital or analog audio signal from an external digital audio (recording) reproducing device such as an MD player is delivered to the first auxiliary terminal 23. An analog audio signal from an external digital audio (recording) reproducing device such as the tape deck 16 is delivered to the second auxiliary terminal 24. The signal connecting terminals 21 to 24 are connected to an input selector 3. An audio signal via USB, i.e., PC-U is inputted via a USB interface 12, which will be described later, to the selector 3. The selector 3 includes a D/A converter and an A/D converter. An audio amplifier 4 amplifies the analog audio signal received via the selector 3, and outputs the amplified signal to a speaker terminal 5. The terminal 5 is connected to a speaker.

The receiver 2 also includes an operator panel 6 including various operation keys. A CPU 7 supervises the overall operation of the receiver 2. A display 8 displays various information items such as a sound source being selected and a DSP mode. An ROM 9 stores various programs for DSP, data for DSP, various control programs, and control data. An RAM 10 serves as a work area to temporarily store various data. The USB interface 12 communicates signals via a USB terminal 13 with the personal computer 14. Specifically, the USB interface 12 transfers a control signal received from the computer 14 to a bus 11 and a control signal received from the bus 11 to the computer 14. On receiving an audio signal (PC-U) from the computer 14, the USB interface 12 sends the signal to the input selector 3.

The audio amplifier 4 includes an amplifier 41 to amplify an audio signal, an RAM 49 to serve also as a work area, and a sound field processor 18 to conduct sound field processing through digital signal processing.

The bus 11 connects the input selector 3, the audio amplifier 4, the operator panel 6, the CPU 7, the display 8, the ROM 9, the RAM 10, and the USB interface 12 to each other.

The RAMs 10 and 49 are connected to a backup power source, not shown. Even if the system is not powered, data can be kept retained therein, for example, about one week.

Figure 2:
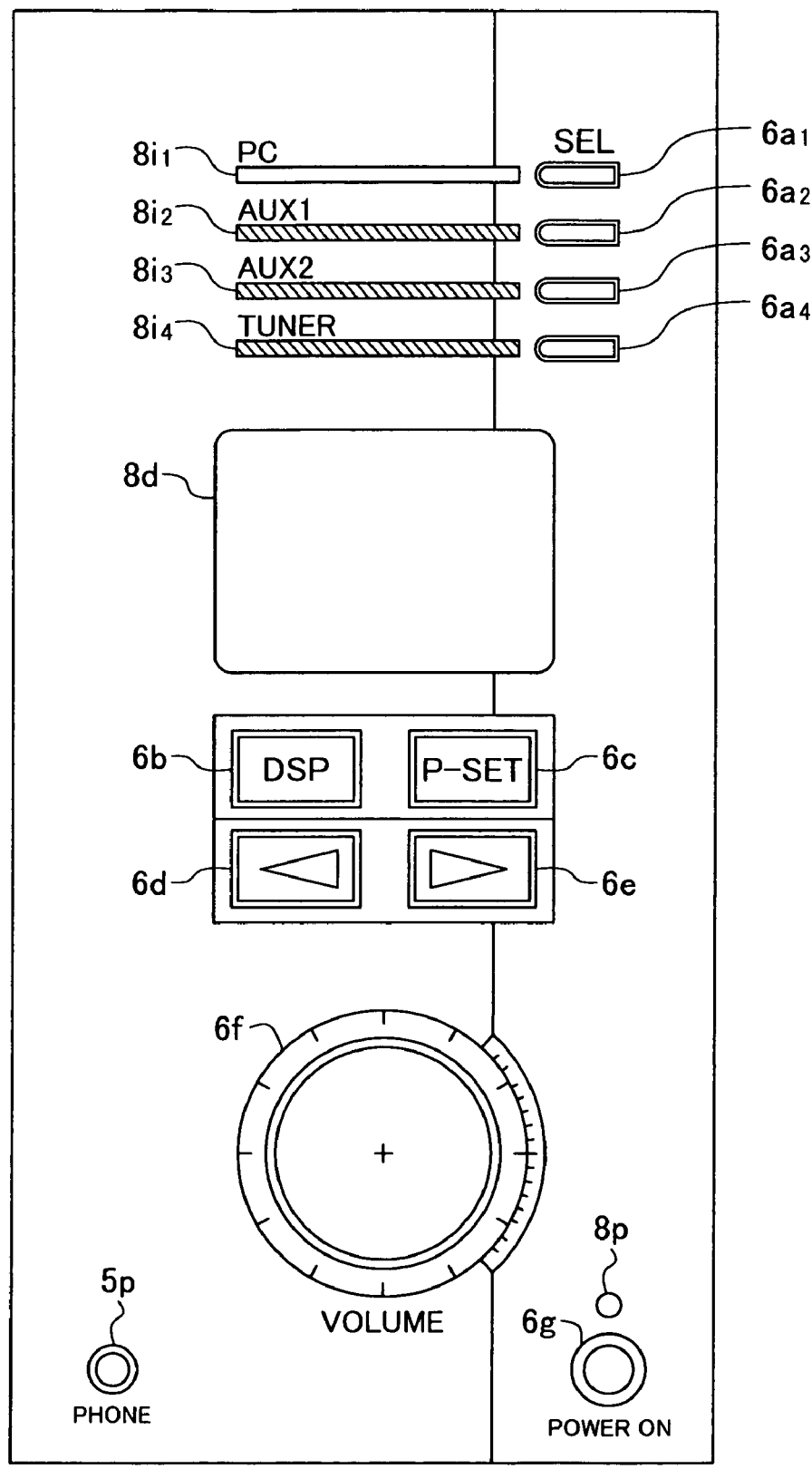
FIG. 2 is an appearance of a front panel of a receiver system.

FIG. 2 shows a front view of a front panel of the receiver 2.

The front panel of the receiver 2 includes a plurality of switches partly constituting the operation panel 6.

Selector switches 6a1 to 6a4 select a sound source. A DSP switch 6b indicates whether or not the DSP is operated. A preset switch 6c, which can be set to on exclusively with respect to the DSP switch 6b, indicates whether or not preset station selection is desired to function when the tuner section is in use. When the DSP switch 6b is on, a pair of up/down switches 6d and 6e function as a DSP mode selection switch. When the preset switch 6c is on, the switches 6d and 6e function as a station selection switch. A volume control 6f adjusts magnitude of sound volume. A power switch 6g turns power on/off.

The front panel of the receiver 2 includes a headphone jack 5p to connect a headphone.

The front panel of receiver 2 further includes display sections each constituting a part oh the display 8.

A multifunctional display section 8d, which includes a dot-matrix transmission liquid crystal display (LCD) with a backlight or a fluorescent luminescence (FL) display element, displays various information. When the sound source currently selected is a sound card of the personal computer 14 connected to the system via the digital audio terminal 21 or the analog audio terminal 22, or the USB terminal 13, a first indicator 8i1 turns on. When the current sound source is an external audio (recording) reproducing device connected to the system via the first auxiliary terminal 23, a second indicator 8i2 turns on. When the current sound source is an external audio (recording) reproducing device connected to the system via the second auxiliary terminal 24, a third indicator 8i3 turns on. When the current sound source is an internal tuner, a fourth indicator 8i4 turns on. When the receiver 2 is powered, a power indicator 8p turns on.

Figure 3:
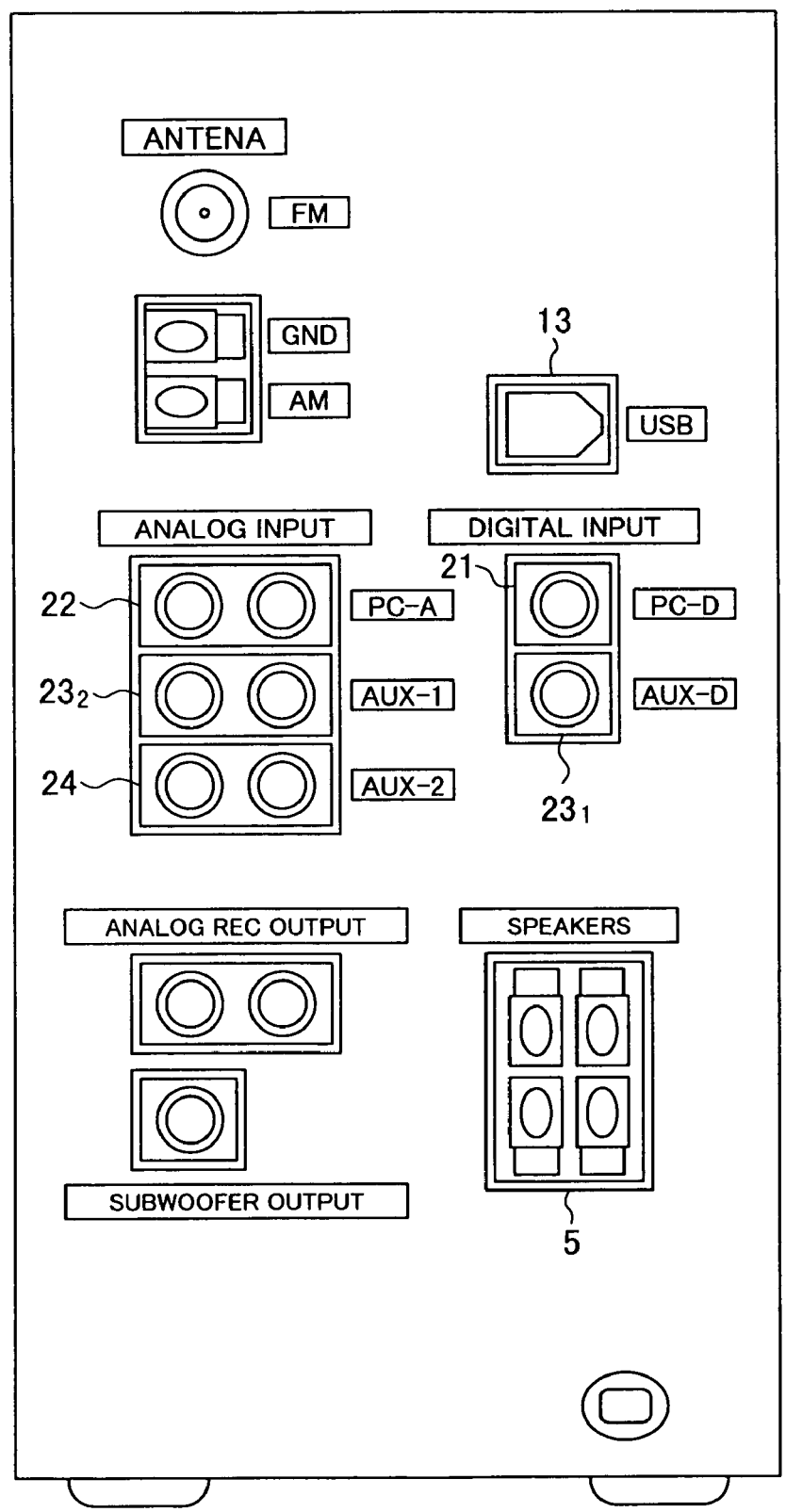
FIG. 3 is an appearance of a rear panel of the receiver system.

FIG. 3 shows a front view of a rear panel of the receiver 2. Arranged on the rear panel are the speaker terminal 5, the digital audio terminal 21, the analog audio terminal 22, and the first and second auxiliary terminals 23 and 24 described above. The first auxiliary terminal 23 includes a digital audio auxiliary terminal 23, to receive a digital audio signal from an external digital (recording) reproducing device and an analog audio auxiliary terminal 232 to receive an analog audio signal from an external digital (recording) reproducing device. The rear panel further includes a USB terminal 13, antenna terminals (an FM antenna terminal, an AM antenna terminal, and a ground terminal), an analog audio output terminal, and a subwoofer output terminal.

Subsequently, description will be given of a data format of transfer data to transfer DSP parameter data from the personal computer 14 to the receiver 2.

Figure 4:
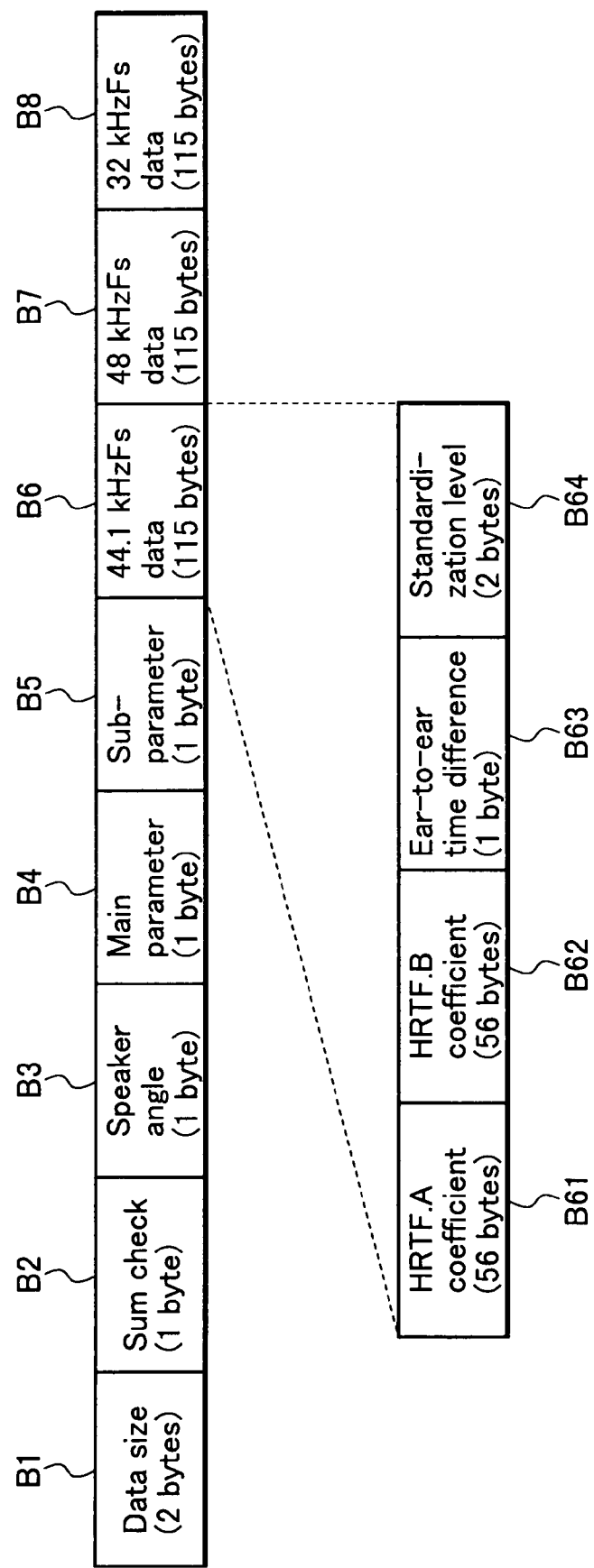
FIG. 4 is a diagram showing a data format of transfer data.

FIG. 4 shows an example of the data format of transfer data.

The data format includes a data size block B1, a check sum block B2, a speaker angle block B3, a main parameter block B4, a sub-parameter block B5, and first to third DSP parameter blocks B6 to B8.

The data size block B1 stores a data size of transfer data, the check sum block B2 stores error checking data, and the speaker angle block B3 stores angular information associated with an azimuth of each position of two virtual rear speakers. The main parameter block B4 stores information of distance between both ears of a listener and the sub-parameter block B5 stores information of a sound receiving area of the ear of the listener. The first to third DSP parameter blocks B6 to B8 respectively store DSP parameter data items corresponding to 44.1 kHz, 48 kHz, and 32 kHz, respectively. The first to third DSP parameter blocks B6 to B8 are the same in constitution to each other. Each block, for example, the block B6 includes an HRTF.A coefficient block B61, an HRTF.B coefficient block B62, an ear-to-ear time difference data block B63, and a standardization level block B64. The block B61 stores head relation transfer function (HRTF).A coefficient data. The data is a constituent item of a head relation transfer function and represents a characteristic when sound is heard by the right ear. The block B62 stores head relation transfer function (HRTF).B coefficient data. This data is a constituent item of a head relation transfer function and represents a characteristic when sound is heard by the left ear. The block B63 stores ear-to-ear time difference data. The data represents difference between both ears with respect to time of arrival of an identical sound at both ears. The block B6 stores standardization level data which indicates a standardization level.

To transfer data from the computer 14 to the receiver 2, an HID class control command is used because an object to be controlled can be freely defined in the command. The transfer data is sent via the USB interface 12.

Figure 6:
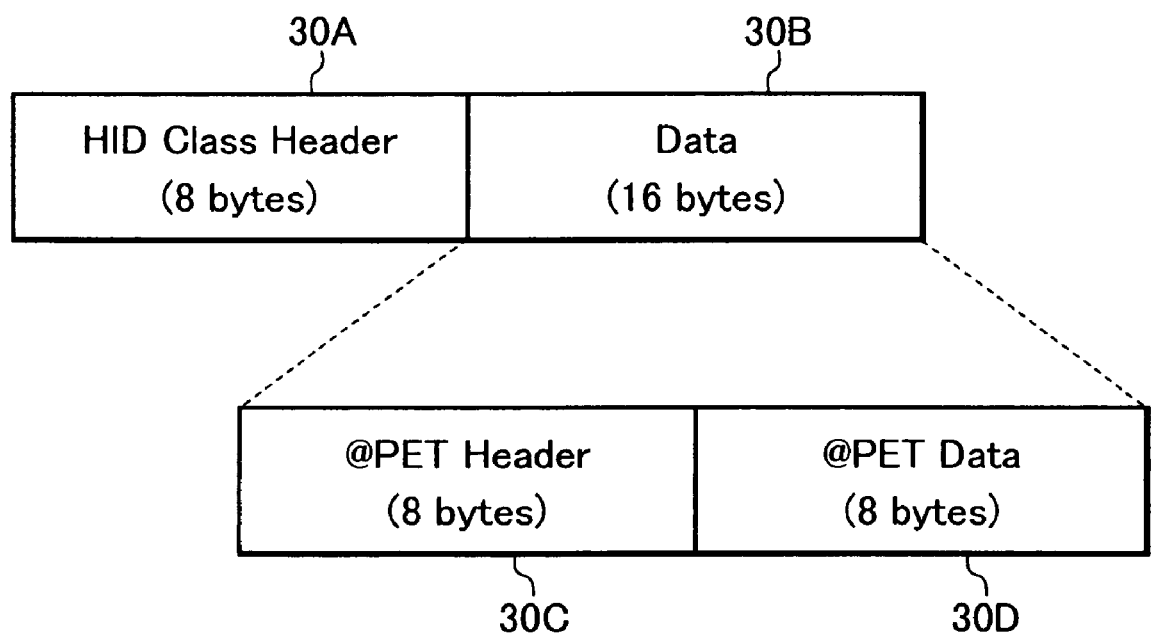
FIG. 6 is a diagram showing a data format of an HID class control command.

FIG. 6 shows a data format of an HID class control command 30 to handle audio signals. The command 30 includes an 8-byte HID class header 30A and a data field 30B.

The data field 30B includes an 8-byte header 30C (@PET Header in FIG. 6) to indicate that this command is a control command equivalent to an audio class control command and an 8-byte data field 30D (@PET Data in FIG. 6).

Next, description will be given of operation of the embodiment.

Figure 5:
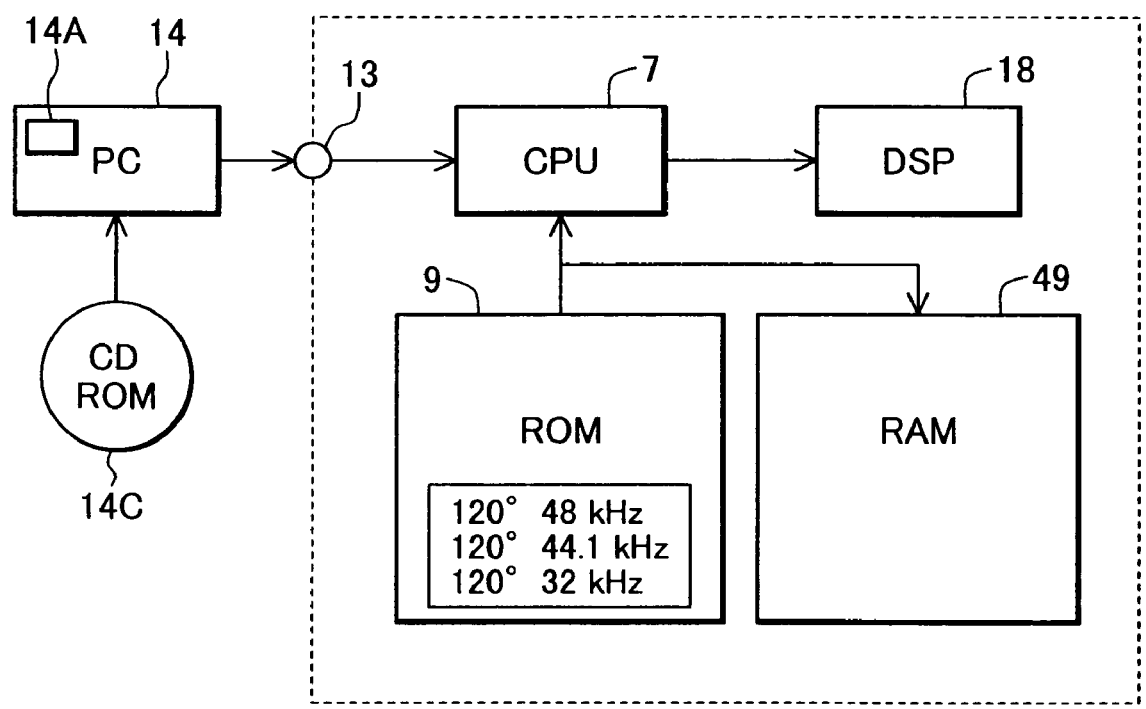
FIG. 5 is a diagram showing initial state of data stored.

FIG. 5 shows an initial state of data stored.

In the initial state, the ROM 9 stores DSP parameters when virtual speakers are arranged with an azimuth of 120° by assuming that a front side of a listener has an azimuth of 0°. The virtual speaker is a speaker virtually implemented as a result of sound field processing by the processor 18. Although no actual speaker exists at the position of the virtual speaker, the listener feels that sound comes therefrom.

The DSP parameter data is stored for each of the sampling frequencies, i.e., 48 kHz, 44.1 kHz, and 32 kHz.

When the user selects a sound source, the processor 18 reads under control of the CPU 7 the DSP parameter data corresponding to the sampling frequency of the sound source to actually execute digital signal processing.

To transfer DSP parameter data from the computer 14, the user conducts operation using a GUI screen.

Before specific operation of the embodiment, constitution of the GUI screen will be described.

Figure 7:
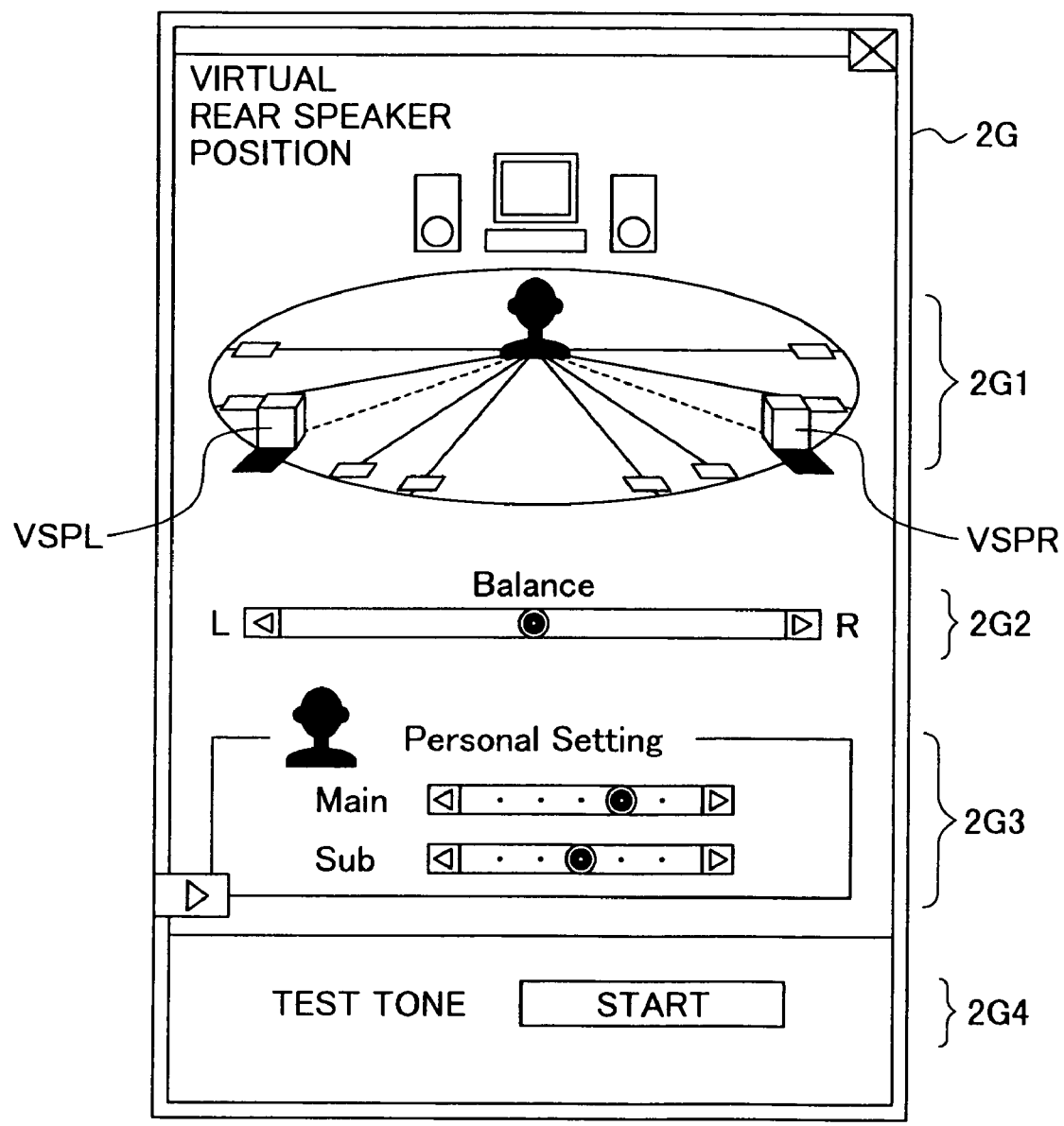
FIG. 7 is a diagram showing a front side of a graphic user interface (GUI) screen (132°)

FIG. 7 shows an example of the GUI screen to set DSP parameter data to adjust positions of virtual rear speakers.

The computer 14 includes a display to display a GUI image 2G. The GUI image 2G includes a position of the listener and positions of virtual rear speakers behind the listener.

The image 2G includes a speaker position item 2G1, a balance item 2G2, and a main/sub parameter item 2G3. The speaker position item 2G1 is used to adjust a virtual rear speaker position, the balance item 2G2 is operated to adjust balance of sound volume of virtual rear speakers on the right and left sides, and the main/sub parameter item 2G3 is provided to indicate, according to taste of the user or listener, data to be set to the main parameter block B4 and the sub-parameter block B5 contained in the transfer data of FIG. 4. The image 2G further includes a test tone item 2G4 to generate a test tone for the user to confirm the state adjusted.

Figure 8:
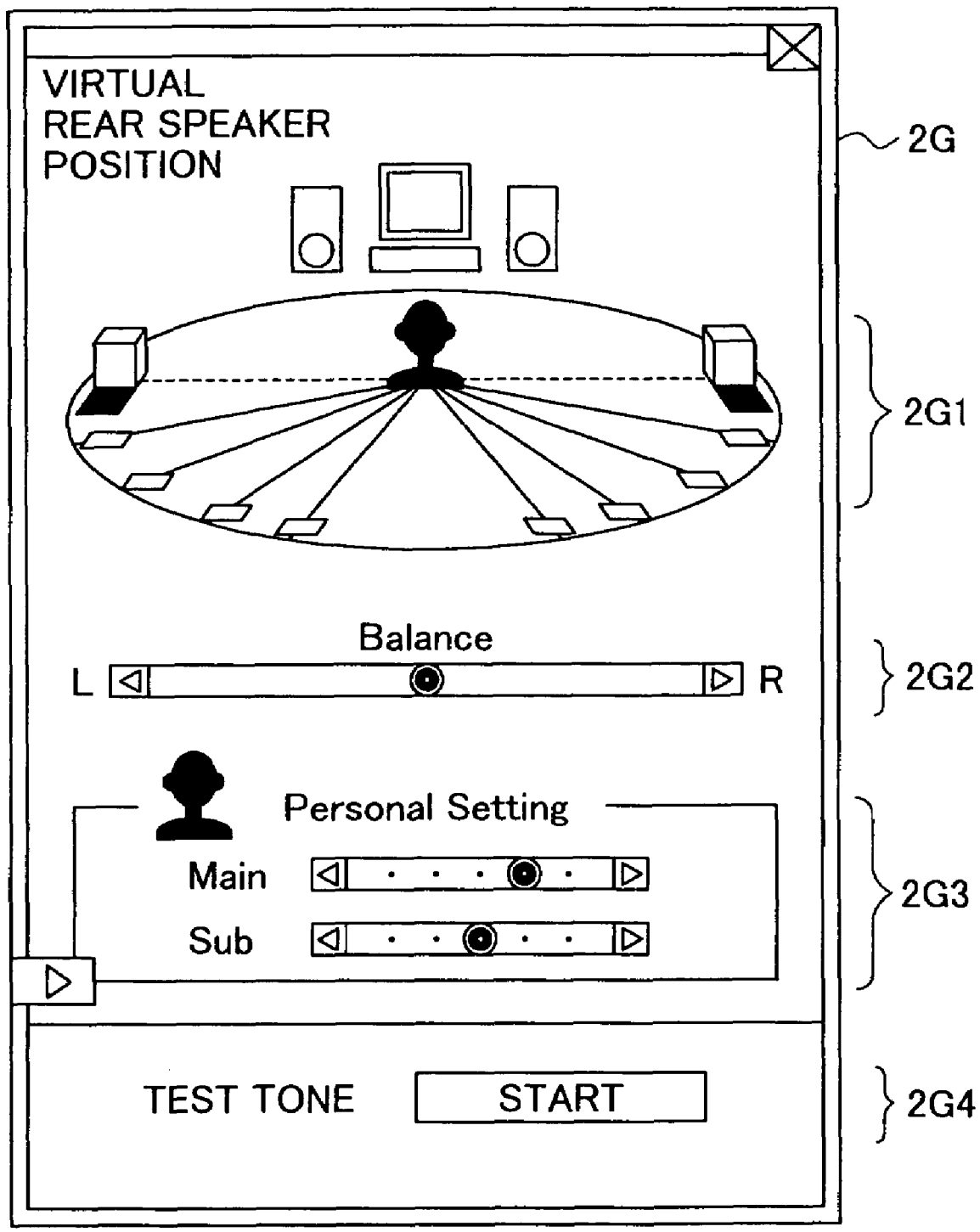
FIG. 8 is a diagram showing a front side of a GUI screen (90°)
Figure 9:
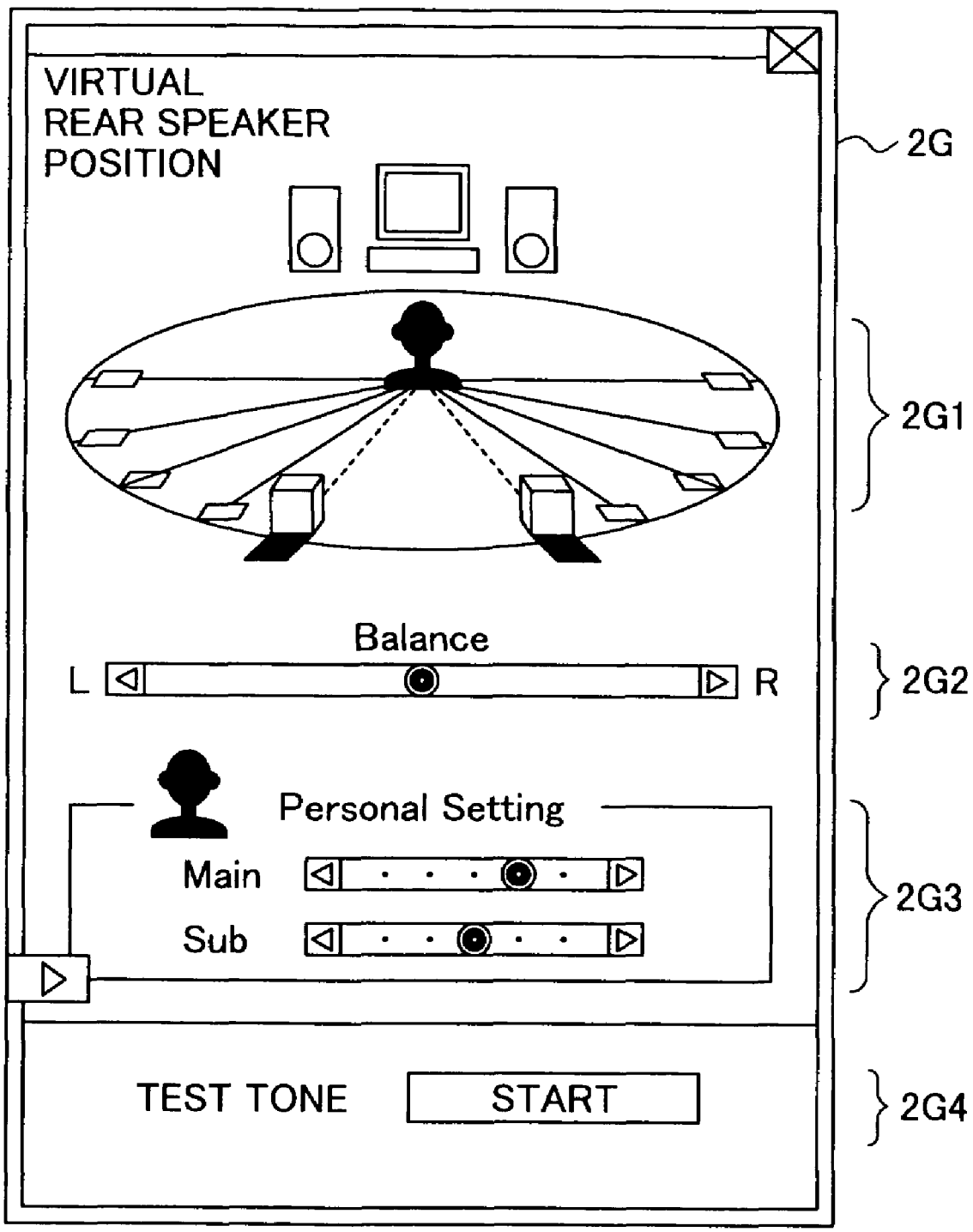
FIG. 9 is a diagram showing a front side of a GUI screen (165°)

FIG. 7 shows the image 2G in which two virtual rear speakers have an azimuth of 132° assuming that a front side of the listener has an azimuth of 0°. FIGS. 8 and 9 similarly show states of the image 2G in which two virtual rear speakers have an azimuth of 90° and an azimuth of 165°, respectively.

Figure 10:
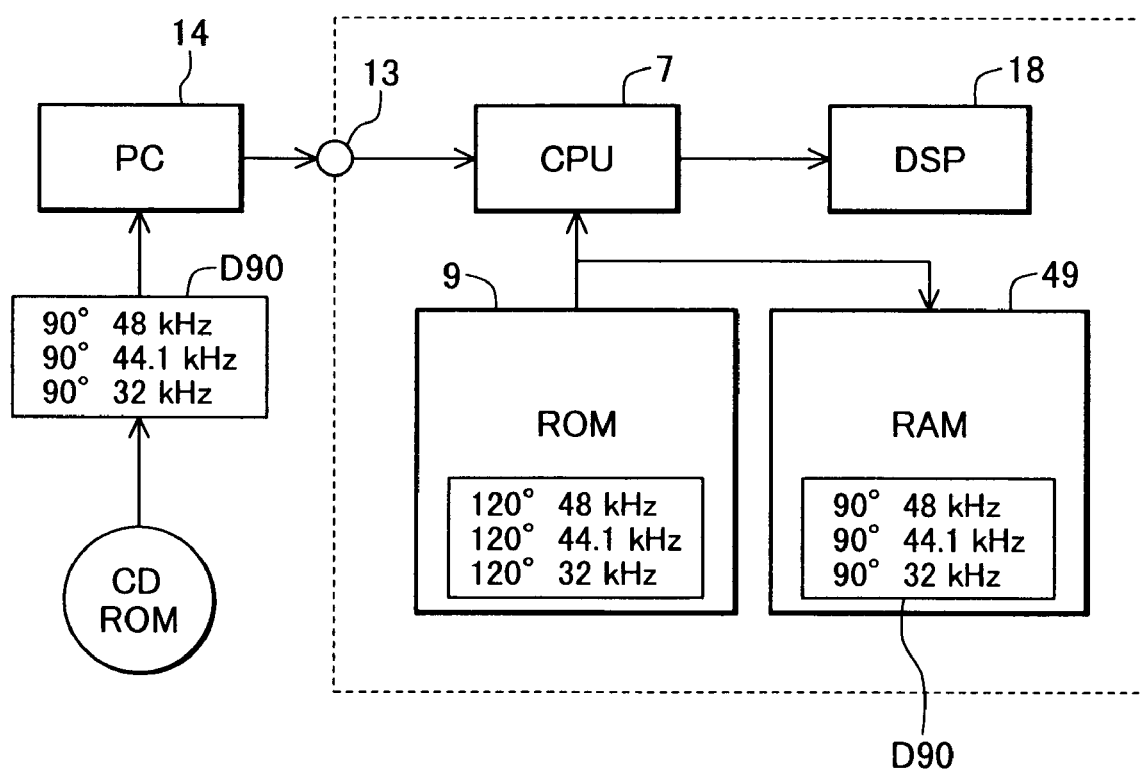
FIG. 10 is a block diagram showing a state of data stored after operation of the embodiment.
Figure 11:
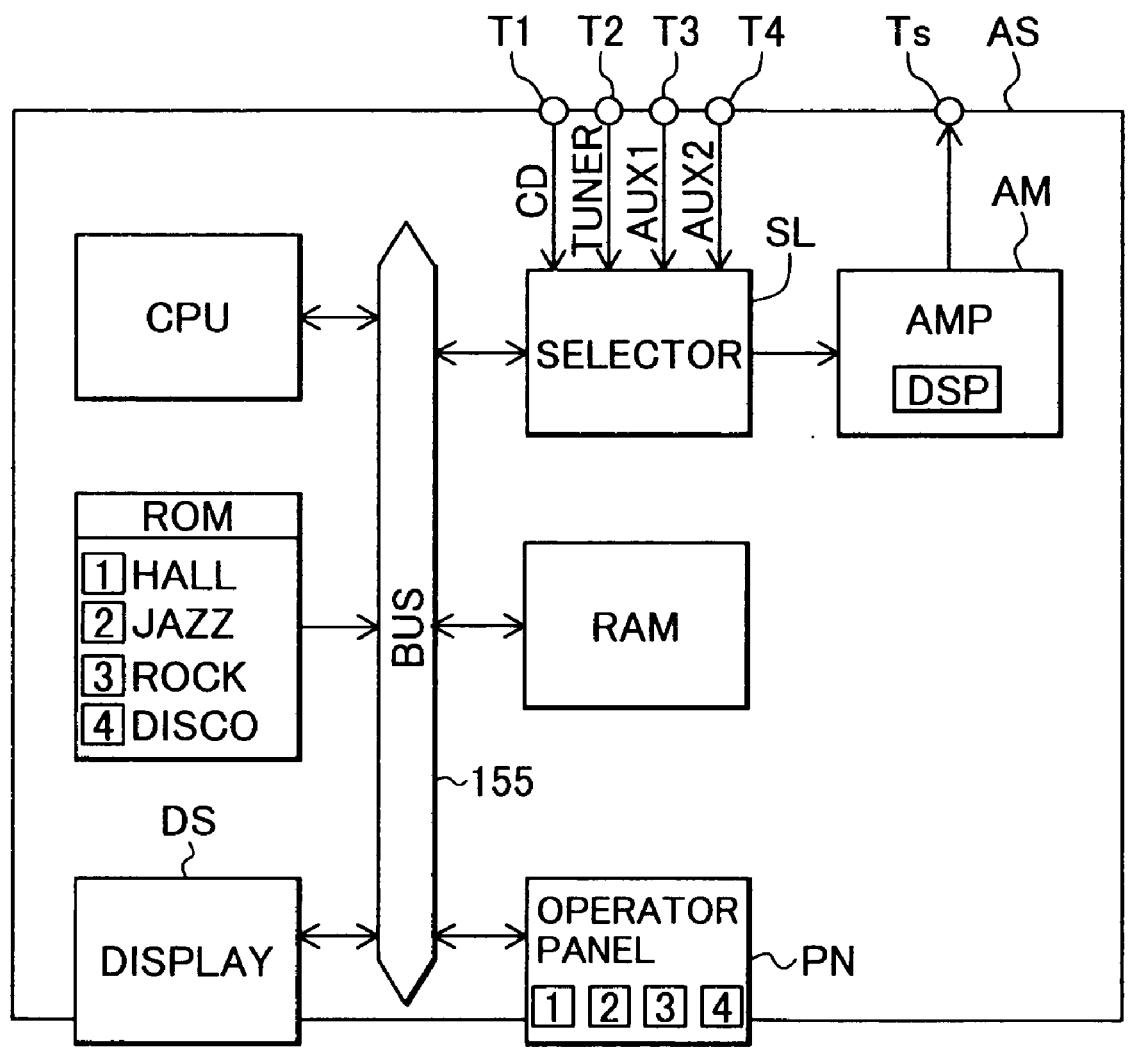
FIG. 11 is a general block diagram of an audio amplifier of the prior art.
Figure 12:
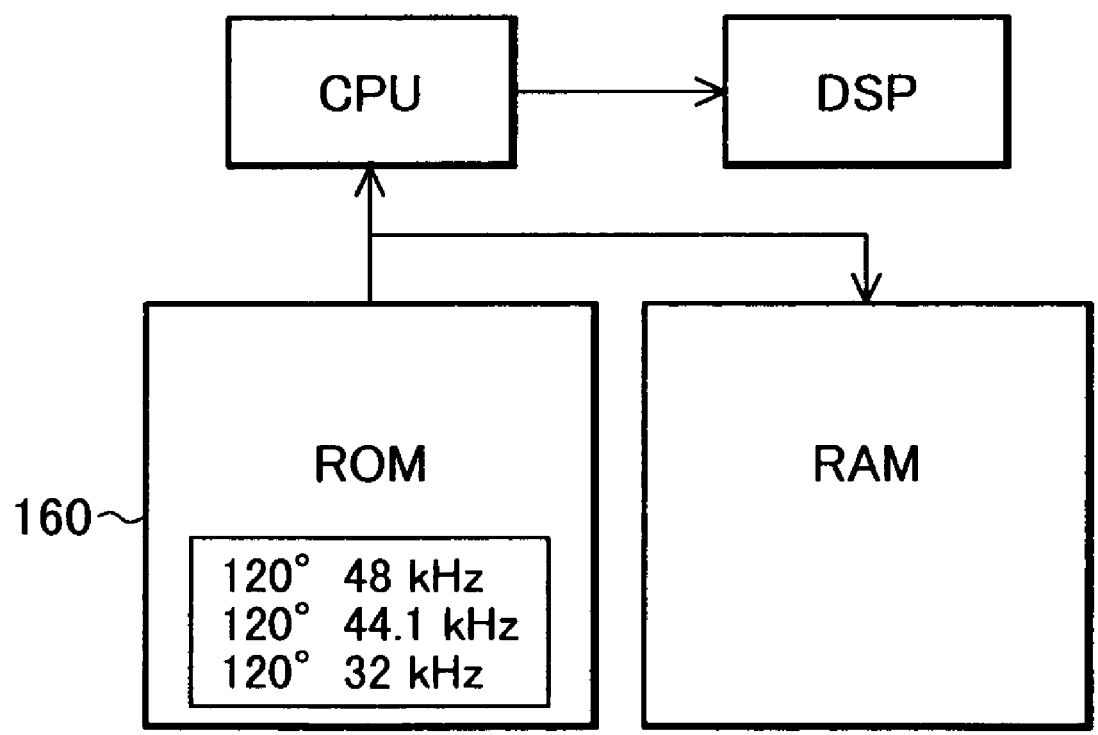
FIG. 12 is a diagram showing a state of data stored in the prior art.

Next, description will be given of actual operation of the GUI image 2G by referring to FIGS. 5, 7, and 10.

As shown in FIG. 5 including a personal computer, a processor 14A, a CDROM 14C, a CPU 7, an ROM 9, a display 18, and an RAM 49, the ROM 9 stores in the initial state the DSP parameter data (basic control data) for a condition in which two virtual rear speakers have an azimuth of 120° respectively on the right and left sides assuming that a front side of the listener has an azimuth of 0°. The CPU 7 detects that DSP parameter data is missing in the RAM 49. Therefore, the CPU 49 instructs the processor 18 to operate according to the DSP parameter data in the ROM 9.

The GUI image of FIG. 7 is presented on the display screen of the personal computer 14. The user drags by a pointing device or a mouse a rear speaker position item VSPR (or VSPL) similar in contour to a rear speaker (for example, by moving a cursor, not shown, with a left button, not shown, kept depressed). For example, as can be seen from FIG. 8, the state of FIG. 7 is changed to a state in which the two virtual rear speakers are moved to have an azimuth of 90° (i.e., the speakers are on the right and left sides of the listener).

The microprocessor 14A of the computer 14 accesses the CDROM 14C to read therefrom DSP parameter data D90 corresponding to the items VSPR and VSPL to generate a set request command. The command is then sent via the USB terminal 13 to the receiver 2.

Having received the set request command, the CPU 7 of the receiver 2 writes the DSP parameter data D90 in a predetermined storage area of the RAM 49.

When execution of sound field processing is instructed thereafter, the CPU 7 detects that the DSP parameter data exists in the RAM 49. The CPU 7 sets the processor 18 to a state of operation using the DSP parameter data in the RAM 49.

As above, according to the embodiment, in addition to the basic data stored in the ROM of the receiver 2, the new DSP parameter data received from the computer 14 is also stored in the receiver 2. Therefore, the memory is not occupied by data which is rarely used and hence efficiency of control operation is improved.

The minimum DSP parameter data required is stored in the ROM 9. Data in the RAM 10 is guaranteed by the backup power. The data in the RAM 10 need not be again stored therein each time the system is powered, which exerts no adverse influence on operability of the system.

In the description of the embodiment, the DSP parameter data as control data is written in the RAM. However, not only the control data but also the entire control program may be re-written.

In such a configuration, a new function can be easily implemented or coped with.

Also in this situation, when the basic control program and the basic control data are kept remained in the ROM, the original state (for the basic operation) can be readily restored.

It is also possible to once write a new control program or new control data in the RAM. After confirmation of normal operation with the new control program or new control data, the new control program or new control data is transferred to the ROM. This minimizes adverse influence of failure in the writing of the program or data.

In addition to the control program, control data corresponding thereto may also be stored in the RAM. Also in this situation, when the basic control program and the basic control data are kept remained in the ROM, the original state (for the basic operation) can be readily recovered.

In the description of the embodiment above, the DSP parameter data is transferred as control data. However, the control data is not limited to the DSP parameter data. Other control data such as GUI display data (to update the GUI image) may also be transferred for this purpose.

In the embodiment, the basic control program and the basic control data are stored in the ROM. However, the program and the data may be written in, in place of the ROM, an electric erasable programmable ROM (EEPROM), a nonvolatile RAM (NVRAM), or the like.

When a new control program or new data is stored in the RAM in the embodiment above, the item in the RAM are preferentially used. However, the user may select, depending on constitution of the system, the ROM or the RAM to read data for the processing.

In the embodiment, one set of DSP parameter data items are stored in each of the ROM and the RAM. However, the system may be configured to store a plurality of sets of DSP parameter data items in at least either one of the ROM and the RAM.

In the description of the embodiment, the USB interface is adopted between the personal computer and the receiver. However, the embodiment is similarly applicable also to a system employing another interface standard.

Although the receiver is used as an audio system in the embodiment, this embodiment is applicable also to other audio (visual) apparatuses such as an amplifier, a tuner, a CD player, a digital video disk (DVD) player, and a digital audio tape (DAT) player.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An audio system comprising:
   a virtual speaker position operation part, an adjustable position of a virtual speaker being given through the virtual speaker position operation part;
   a sending unit for sending DSP parameter data that is prepared for each of sampling frequencies and includes data defining the adjustable position of the virtual speaker given through the virtual speaker position operation part;
   a first memory for storing the DSP parameter data being sent from the sending unit;
   audio signal terminals corresponding to sound sources, where audio signals from the sound sources are input through the audio signal terminals;
   a selector for selecting a sound source from among the sound sources;
   a sound field processor for sound field processing the sound signal from the selected sound source using one of the DSP parameter data corresponding to the sampling frequency of the sound source selected by the selector; and
   an output terminal, the audio signal processed by the sound field processor being output through the output terminal,
   wherein the sound field processor processes the sound signal using the DSP parameter data stored in the first memory and the audio system further comprises a second memory which stores an initial state of the DSP parameter data, and wherein the sound field processor operates according to the DSP parameter data stored in the second memory when the DSP parameter data is missing in the first memory.

2. The audio system according to claim 1, wherein the DSP parameter includes constituent of a head relation transfer function for a right ear, constituent of a head relation transfer function for a left ear and constituent representing difference between both ears with respect to time of arrival of an identical sound at both ears.

3. The audio system according to claim 1, further comprising:
   a central processing unit which detects whether the DSP parameter data exists in the first memory and sets the sound field processor to a state of operation using the DSP parameter data in the first memory.

4. An audio system comprising:
   a virtual speaker position operation part, an adjustable position of a virtual speaker being given through the virtual speaker position operation part;
   a sending unit for sending DSP parameter data that is prepared for each of sampling frequencies and includes data defining the adjustable position of the virtual speaker given through the virtual speaker position operation part;
   a memory for storing the DSP parameter data being sent from the sending unit;
   audio signal terminals corresponding to sound sources, where audio signals from the sound sources are input through the audio signal terminals;
   a selector for selecting a sound source from among the sound sources;
   a sound field processor for sound field processing the sound signal from the selected sound source using one of the DSP parameter data corresponding to the sampling frequency of the sound source selected by the selector; and
   an output terminal, the audio signal processed by the sound field processor being output through the output terminal,
   wherein the sound field processor processes the sound signal using the DSP parameter data stored in the memory, and the sending unit comprises a display screen displaying a GUI image showing a virtual speaker item, a user adjusting the position of the virtual speaker by moving the virtual speaker item, the sending unit sending DSP parameter data corresponding to the adjusted position of the virtual speaker by the user.

5. The audio system according to claim 3, wherein the DSP parameter includes constituent of a head relation transfer function for a right ear, constituent of a head relation transfer function for a left ear and constituent representing difference between both ears with respect to time of arrival of an identical sound at both ears.

6. The audio system according to claim 4, wherein the DSP parameter includes constituent of a head relation transfer function for a right ear, constituent of a head relation transfer function for a left ear and constituent representing difference between both ears with respect to time of arrival of an identical sound at both ears.

* * * * *